(12) United States Patent
Legrand et al.

(10) Patent No.: US 7,705,587 B2
(45) Date of Patent: Apr. 27, 2010

(54) IRREGULAR SATURATED POLE POSITION SENSOR

(75) Inventors: Bertrand Legrand, Grenoble (FR); Olivier Andrieu, Saint Maurice de Beynost (FR)

(73) Assignee: Electrifil Automotive, Miribel Cedex (FR)

( * ) Notice: Subject to any disclaimer, the term of this patent is extended or adjusted under 35 U.S.C. 154(b) by 412 days.

(21) Appl. No.: 11/658,251

(22) PCT Filed: Jul. 27, 2005

(86) PCT No.: PCT/FR2005/001963
§ 371 (c)(1),
(2), (4) Date: May 2, 2007

(87) PCT Pub. No.: WO2006/018543
PCT Pub. Date: Feb. 23, 2006

(65) Prior Publication Data
US 2008/0290862 A1     Nov. 27, 2008

(30) Foreign Application Priority Data
Jul. 27, 2004   (FR) .................................. 04 08281

(51) Int. Cl.
G01B 7/30     (2006.01)
G01R 33/09    (2006.01)
G01R 33/07    (2006.01)

(52) U.S. Cl. .................. 324/207.25; 324/251; 324/252; 324/207.2; 324/207.21

(58) Field of Classification Search ......... 324/173–174, 324/207.2, 207.21, 207.25, 207.24, 251–252; 123/612, 617; 338/32 R, 32 H; 73/514.31, 73/514.39
See application file for complete search history.

(56) References Cited

U.S. PATENT DOCUMENTS

| 4,695,795 A | 9/1987 | Nakamizo et al. |
| 4,866,381 A | 9/1989 | Tatsuhiko |
| 5,574,364 A | 11/1996 | Kajimoto et al. |

*Primary Examiner*—Bot L LeDynh
(74) *Attorney, Agent, or Firm*—Dennison, Schultz & MacDonald

(57) ABSTRACT

According to the invention, the position sensor is characterized in that the correction means (3) are achieved by at least one saturated magnetic pole, a so-called stabilization pole (Ps), having a sign opposite to the sign of the irregular pole (Pi) which is also saturated, each stabilization pole (Ps) extending from one to the other edge of the magnetic ring, by being inserted in the irregular pole, so as to stabilize the magnetic signal delivered by the passage of the poles adjacent to the irregular pole, said magnetic signal delivered between the passage of the adjacent poles not passing through the zero value.

15 Claims, 1 Drawing Sheet

IRREGULAR SATURATED POLE POSITION SENSOR

This application is a filing under 35 USC 371 of PCT/FR2005/001963, filed Jul. 27, 2005.

BACKGROUND OF THE INVENTION

The object of the invention relates to the technical field of magnetic sensors including an encoder component moving close to a detection cell, and broadly speaking, adapted for locating at least one angular position.

The object of the invention more particularly relates to making a sensor, the encoder of which is equipped with a series of North poles and South poles mounted in an alternating way.

The object of the invention finds a particularly advantageous application in the automotive field where this sensor may for example be used within the framework of ignition functions.

In the preferred field above, it is known how to apply an adapted magnetic sensor for measuring the intensity change of a magnetic induction field when a ferromagnetic encoder provided with field perturbation units, moves past a detection cell. The detection cell such as a Hall effect or magneto-resistive probe, for example, delivers a periodic sinusoidal signal. The detection cell is associated with a level comparator with hysteresis, such as a Schmitt trigger, in order to obtain clear-cut transitions of the output voltage for distinct values of the magnetic induction according to whether it changes by increasing or by decreasing.

In order to form a velocity detection sensor, it is known how to make an encoder provided with teeth laid out in a regular way and in high numbers for improving the resolution of such a sensor. An enhancement to this sensor is known which consists of making an encoder formed by a multipolar magnetic ring provided on its circumference with alternating North poles and South poles, regularly spaced out according to a given pitch.

In order to allow at least one position to be determined, which for example corresponds to the ignition top dead centre of a cylinder, it is known how to make a mark on the magnetic encoder. Thus, it is for example known how to suppress two teeth on the cog wheel. In the solution applying an encoder with alternating North and South poles, either suppressing several magnetic poles by leaving an empty space, or replacing one or more poles of a given sign with one or more poles of an opposite sign, may be contemplated. A so-called irregular or singular pole having a magnetization with a sign opposite to the sign of both of its adjacent poles on the one hand, and a different spacing relatively to the spacing pitch of the other poles on the other hand are thereby achieved.

In order to achieve good accuracy in measurement, notably as regards the detection of the irregular pole, French Patent FR 2 757 943 teaches how to make an encoder comprising, for each irregular pole, means for correcting the value of the magnetic field generated by the irregular pole, so that the signal delivered by the passage of the poles neighboring said irregular pole, is symmetrical relatively to the zero value of the magnetic field.

By applying such an encoder, it is possible to obtain at the output of the detection cell of the sensor, a magnetic signal with constant period, as regards the regular poles. As a result of this, good accuracy of the thereby conducted measurements notably for locating the irregular pole, is achieved.

If the technical solution described in this patent gives satisfaction in practice, under certain operating conditions, a, large range variation of the width of the delimited gap between the encoder and the measurement cell was seen on the one hand, and a not insignificant side shift was seen on the other hand between the plane of rotation of the encoder and the axis of the measurement cell, which is detrimental to the accuracy of the measurements.

Also, U.S. Pat. No. 4,866,381 describes a position sensor including an encoder provided on its circumference with alternating North poles and South poles and mounted in order to move past a measurement cell. Such an encoder includes a magnetic singularity formed by a series of North and South poles having a determined pitch adapted for stabilizing the magnetic signal delivered by the passage of the poles adjacent to this singularity and inside this singularity. The ideal signal of this position sensor includes, upon passing the singularity, a succession of high and low states, consecutive to the passages through zero of the corresponding magnetic signal at different poles of the singularity.

SUMMARY OF THE INVENTION

The present invention aims at finding a remedy to the drawbacks of the prior art, by proposing a sensor having simplicity and good accuracy for notably localizing the irregular pole, even for large variations of the measurement gap and of the side shift between the plane of rotation of the encoder and the axis of the measurement cell.

To achieve such goals, the position sensor is of the type including an encoder formed by a multipolar magnetic ring provided, on its circumference, with alternating North poles and South poles, and mounted in order to move past a measurement cell delivering a periodic signal corresponding to the change in the intensity of the magnetic field delivered by the poles, at least one of said poles of a sign opposite to the sign of its adjacent poles is said to be "irregular" and includes between both of its adjacent poles, a spacing different from the spacing pitch between the other poles on the one hand and means for correcting the value of its magnetic field on the other hand, so as to stabilize the magnetic signal delivered by the passage of the poles neighboring said irregular pole, said delivered magnetic signal between the passage of the adjacent poles not passing through the zero value.

According to the invention, the correcting means are achieved by at least one saturated magnetic pole, a so-called stabilization pole, having a sign opposite to the sign of the irregular pole which is also saturated, each stabilization pole extending from one to the other edge of the magnetic ring, by being inserted into the irregular pole so as to stabilize the magnetic signal delivered by the passage of the poles adjacent to the irregular pole.

As a result of the invention, the irregular pole with a sign opposite to those of the stabilization poles, includes a series of elementary poles each extending from one to the other edge of the magnetic ring, between which the stabilization poles are inserted.

Advantageously, the stabilization and elementary poles each have constant width from one to the other edge of the magnetic ring.

According to an exemplary embodiment, the stabilization poles have identical width.

According to another alternative embodiment, all the stabilization poles have different width.

According to still another embodiment, all the stabilization poles and elementary poles have identical width.

According to another alternative embodiment, all the stabilization poles have identical width but with a value different from the widths of the elementary poles.

According to one feature of the invention, the total width of the stabilization poles is less than the total width of the elementary poles.

According to another feature of the invention, the alternating North and South poles are saturated magnetic poles.

According to an aspect of the invention, the stabilization pole(s) are inserted into the irregular pole, so as to stabilize the magnetic signal delivered by the passage of the poles adjacent to the irregular pole so that such a signal, as considered between the passage of an adjacent pole and the middle of the irregular pole, changes monotonously.

According to another aspect of the invention, the stabilization pole(s) are inserted into the irregular pole, so as to stabilize the magnetic signal delivered by the passage of the poles adjacent to the irregular pole so that such a signal is symmetrical with respect to the zero value of the magnetic field.

According to another aspect of the invention, the stabilization pole(s) are inserted into the irregular pole so as to stabilize the magnetic signal delivered by the passage of the poles adjacent to the irregular pole, so that such a signal has a constant period as regards the poles adjacent to the irregular pole.

According to another aspect of the invention, the stabilization pole(s) are inserted into the irregular pole so as to stabilize the magnetic signal delivered by the passage of the poles adjacent to the irregular pole, so that such a signal exhibits symmetry with respect to the middle of the irregular pole.

Advantageously, the measurement cell is a Hall effect cell, a differential Hall effect cell, a Hall effect cell with flux concentrator, a giant magnetoresistive cell.

In a preferential application of the sensor according to the invention, the encoder is blocked in rotation on a shaft of an engine of a motor vehicle.

BRIEF DESCRIPTION OF THE DRAWINGS

Various other features will become apparent from the description made below with reference to the appended drawings which show, as non-limiting examples, embodiments and applications of the object of the invention.

DESCRIPTION OF THE PREFERRED EMBODIMENTS

Figure 1:
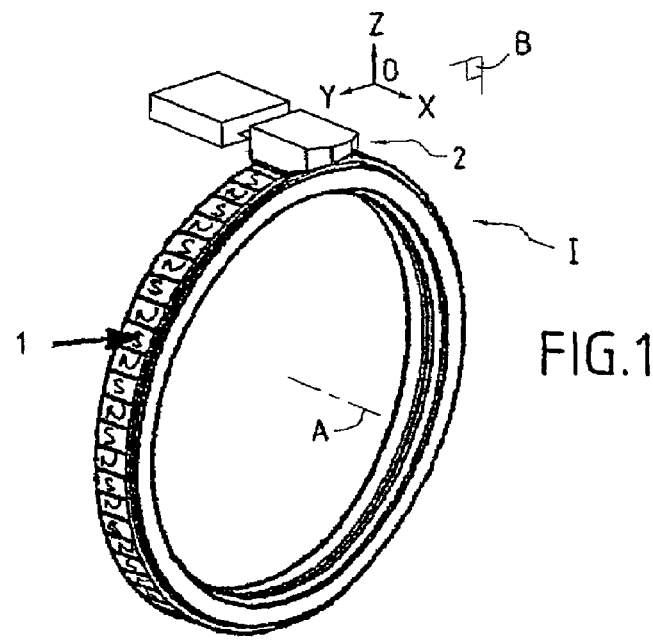
FIG. 1 is a general view showing an exemplary embodiment of a position sensor according to the invention.

FIG. 1 shows an exemplary embodiment of a position sensor I including a magnetic encoder 1 mounted in order to move past a detection cell 2. The encoder 1 is formed as a multipolar magnetic ring, driven into rotation around its centre, along an axis A parallel to the OX direction and provided, on its circumference, with alternating North poles N and South poles S having radial magnetization. In the illustrated example, the encoder 1 includes a series of South poles S and of North poles N laid out so as to have a regular spacing pitch between two neighboring poles. For example, the angular width of each pole is 3°. According to the invention and as this is more specifically apparent in FIG. 2, the encoder 1 also includes at least one pole, a so-called irregular pole Pi, having, between both of its adjacent poles Pa, a spacing different from the regular spacing pitch between the poles S and N. In the illustrated example, the irregular pole Pi has an angular width of 15° and forms a North pole whereas the adjacent poles Pa are of opposite signs, i.e., South poles. Of course, the polarities of the adjacent poles Pa and of the irregular pole Pi may be inverted. For example, the encoder 1 is formed by a ring forming a support on which is adhered a ring made in an elastomer loaded with magnetized particles in order to form the North and South poles.

According to the invention, for each irregular pole Pi, the encoder 1 includes means 3 for correcting or compensating the value of the magnetic induction field generated by the irregular pole Pi, relatively to the value of the magnetic induction field generated by the neighboring poles, so as to stabilize the magnetic signal delivered by the cell 2 by the passage of the poles neighboring said irregular pole. As this will described in the subsequent description, with the means 3, the value of the magnetic induction generated by the irregular pole Pi may be corrected, so that it does not perturbate the inductions of the neighboring poles. Thus, the correction means 3 are determined in such a way that the signal, corresponding to the change in the intensity of the magnetic field delivered by the poles neighboring the irregular pole Pi, is not perturbated by the magnetic induction generated by the irregular pole Pi. The means 3 are therefore adapted so as to reduce the magnetic flux generated by the irregular pole, while maintaining it at a sufficient value to allow it to be detected.

Figure 2:
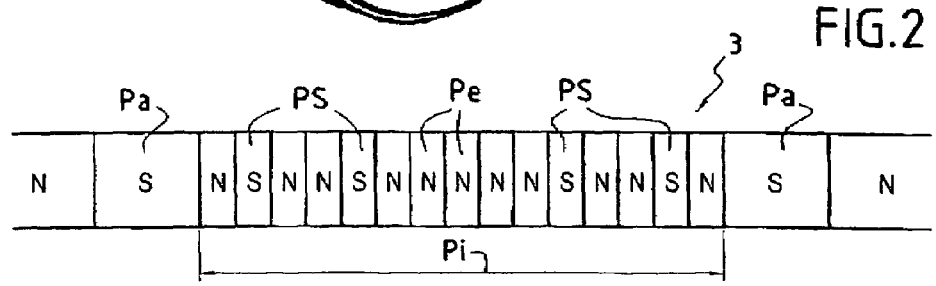
FIG. 2 is a view, reduced to a plane, of a first exemplary embodiment of an encoder according to the invention.

According to the invention, the correction means 3 are achieved by at least one and in the example illustrated in FIG. 2, four so-called stabilization magnetic poles Ps having a sign opposite to the sign of the irregular pole Pi. In the illustrated example, the irregular pole Pi is a North pole so that each stabilization pole Ps is a South pole. The stabilization poles S are thus inserted into the irregular pole Pi so that the latter is formed by elementary poles Pe and the stabilization poles Ps.

According to the invention, the elementary poles Pe and the stabilization poles Ps each extend from one to the other edge of the magnetic ring. Advantageously, each of the elementary poles Pe and of the stabilization poles Ps have a substantially constant width from one to the other edge of the magnetic ring.

According to another feature of the invention, the stabilization poles Ps and the elementary poles Pe are saturated. In other words, the constitutive material of the stabilization poles Ps and elementary poles Pi is saturated, i.e., the magnetization of the North or elementary poles in the illustrated example corresponds to the negative value of the maximum magnetization of the material, whereas the magnetization of the South or stabilization poles in the illustrated example corresponds to the positive value of the maximum magnetization of the material.

Insofar that the stabilization poles Ps and the elementary poles Pe are saturated, the irregular pole Pi is not very sensitive to the neighboring magnetic areas which are capable of changing over time the induction level and consequently the output signal of the detection system. With the irregular pole Pi according to the invention, it is possible to obtain a long-lasting sensor.

It should be considered that the stabilization poles Ps are arranged in number and in position so as to stabilize the magnetic signal delivered by the passage of the poles adjacent to the irregular pole. In other words, the stabilization pole(s) Ps are inserted into the irregular pole Pi so as to stabilize the magnetic signal delivered by the passage of the poles Pa adjacent to the irregular pole Pi, so that such a signal includes either one of the characteristics described hereafter.

Figure 3:
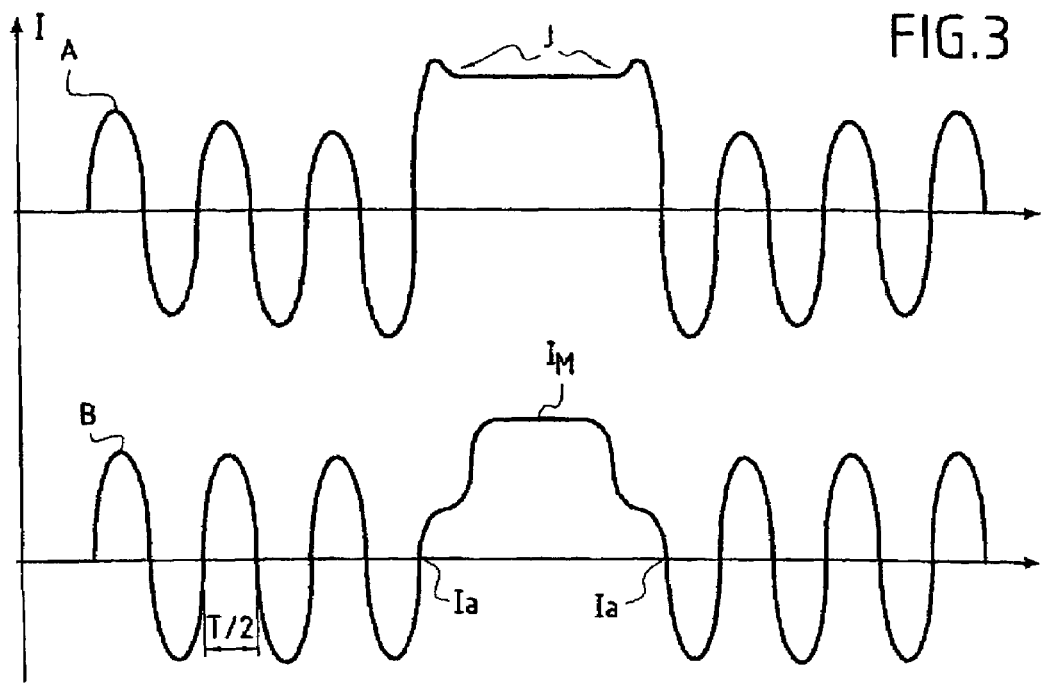
FIG. 3 is a curve illustrating the change in magnetic induction obtained during the displacement of an encoder according to FIG. 2.

By examining FIG. 3, the benefit of applying stabilization means 3 may be shown. FIG. 3 is a diagram showing the change in the magnetic induction field I in Gauss and more specifically of the component of the magnetic signal, perpendicular to the surface of the encoder, versus the angular position of the encoder 1 relatively to a detection cell 2. Curve A shows the change in the magnetic induction I of an encoder 5 without any stabilization means 3 according to the invention, whereas curve B shows the change in the magnetic induction I of an encoder 1 equipped with stabilization means 3 according to the invention. As apparent from this figure, the presence of the irregular pole Pi not including any stabilization means, influences the magnetic induction field of the neighboring poles.

Thus, as this is apparent from FIG. 3, curve A shows two areas J corresponding to the passages of the adjacent poles Pa and each including a maximum followed by a decrease. The presence of such areas J prevents differential mode detection. Now, with curve B which represents the component of the magnetic signal perpendicular to the surface of the encoder 2 according to the invention, it may be seen that by forming the irregular pole Pi, as described above, it is possible to find a remedy to this drawback, insofar that such a signal, considered between the passage Ia of an adjacent pole Pa and the passage $I_M$ of the middle of the irregular pole Pi, changes monotonously, i.e., in a single direction. Therefore as a result, the magnetic signal does not pass through the magnetic zero or the zero value between both passages Ia of the adjacent poles Pa. The stabilization poles Ps incorporated into the irregular pole Pi therefore do not cause the detected magnetic signal to pass through the zero value.

Moreover, in the absence of stabilization means 3 according to the invention, a drift in amplitude and in phase of the induction thus occurs on curve A, which is all the more enhanced since the regular pole is close to the irregular pole. A phase shift then occurs in the induction signal. By examining curve B, it may be seen that the magnetic induction generated by the irregular pole Pi will not perturb the magnetic induction field of the neighboring magnetic poles. The signal giving the change in intensity of the magnetic field delivered by the regular poles neighboring the irregular pole Pi, is symmetrical with respect to the zero or null value of the magnetic field. Such a symmetry of the magnetic signal is achieved regardless of the width of the gap, i.e., the distance between the detection cell 2 and the magnetic ring 1. It is found that signal I has a constant period T as regards the regular poles neighboring the irregular pole. Moreover, the stabilization pole(s) Ps are inserted into the irregular pole Pi, so as to stabilize the magnetic signal delivered by the passage of the poles Pa adjacent to the irregular pole Pi, so that such a signal has a symmetry with respect to the passage $I_M$ of the middle of the irregular pole Pi.

By applying the stabilization means 3, as described above, it is possible to achieve good accuracy of the measurements conducted for locating the irregular pole Pi.

According to an advantageous feature of the invention, the magnetic induction generated by the encoder 1 may be detected by a sensitive cell 2 of any type, such as a Hall effect cell, a differential Hall effect cell, a Hall effect cell with a flux concentrator, a magnetoresistive cell, giant magnetoresistance cell (GMR).

It should be considered that the order and number of the elementary poles Pe and of the stabilization poles Ps, as well as the width of each of them, are variable depending on the targeted application and on the nature of the selected correction or stabilization.

According to the exemplary embodiment illustrated in FIG. 2, all the stabilization poles Ps and elementary poles Pe each have same width. In the illustrated example, each stabilization pole Ps and elementary pole Pe has a width equal to 1°. According to this example, the irregular pole Pi is formed by elementary stabilization poles Ps distributed in the following way: Pe, Ps, 2Pe, Ps, 5Pe, Ps, 2Pe, Ps, Pe.

Another exemplary embodiment may be provided, in which all the stabilization poles Ps have identical width, but with a value different from the widths of the elementary poles Pe. According to this example, the irregular pole Pi is formed in the following way: 3Pe, Ps, 7Pe, Ps, 3Pe. Each stabilization pole Ps has a width of 0.5°, whereas the elementary poles Pe together have an angular width of 14°.

The encoder 1 according to the invention, as describes above, is intended to be mounted on a, broadly speaking, rotating target, from which at least one position is determined. According to a preferred embodiment feature, the encoder 1 according to the invention is intended to be mounted on a drive pulley mounted on the output side of an engine of a motor vehicle, i.e., on a distribution pulley or on one of the auxiliary pulleys. According to an advantageous feature, the encoder 1 is mounted on the drive pulley which is found in the axis of the crankshaft, so as to allow detection of the ignition top dead centre of a cylinder.

It should be noted that the object of the invention may also be applied to the making of a sensor including a magnetic ring 1 provided with several irregular poles Pi for locating several positions. Advantageously, the magnetic ring 1 for example includes four irregular poles Pi with which the position of the cylinders of an engine may be located. In this case, the encoder 1 is mounted integrally with the camshaft of a motor vehicle engine. Of course, the encoder 1 may be mounted on the camshaft while having a single irregular pole.

According to another preferred embodiment feature, the encoder 1 according to the invention is intended to be mounted inside a plate for supporting a dynamic seal gasket for a transmission shaft, mounted between the crankshaft and the gear box of an engine of a motor vehicle. The encoder 1 is driven into rotation by the transmission shaft and is mounted in a proximity relationship with at least one detection cell 2 mounted on the plate for supporting the seal gasket, in order to form a position sensor.

According to another preferred embodiment feature, the encoder 1 according to the invention is blocked in rotation on a shaft of an engine of a motor vehicle or is driven into rotation by the crankshaft or the camshaft of an engine of a motor vehicle, by being mounted inside the engine block of such a vehicle, in a proximity relationship with a detection cell 2 in order to form a position sensor.

The invention is not limited to the described and illustrated examples, as various modifications may be made thereto without departing from its scope.

The invention claimed is:

1. A position sensor including an encoder formed by a multipolar magnetic ring having a circumference provided with alternating North poles (N) and South poles (S) and mounted to enable movement past a measurement cell delivering a periodic signal which corresponds to a change in intensity of a magnetic field delivered by the poles, at least one of said poles being defined as an irregular pole (Pi) and having a sign opposite to a sign of poles adjacent thereto (Pa), and having between adjacent poles (Pa) a spacing pitch different from the spacing pitch between other poles of the ring, and including means for correcting magnetic field value so as to stabilize a magnetic signal delivered by the passage of the poles adjacent to said irregular pole, said magnetic signal delivered between the passage of the adjacent poles not passing through a zero value, wherein the correction means comprises at least one saturated magnetic stabilization pole (Ps) having a sign opposite to the sign of the irregular pole (Pi) which is also saturated, each said stabilization pole (Ps) extending from a first edge of the magnetic ring to an opposite edge, while being inserted into the irregular pole, so as to stabilize the magnetic signal delivered by the passage of the poles adjacent to the irregular pole.

2. The position sensor according to claim 1, wherein the irregular pole (Pi), with a sign opposite to the stabilization poles (Ps), includes a series of elementary poles (Pe) each extending from the first to the opposite edge of the magnetic ring, between which the stabilization poles (Ps) are inserted.

3. The position sensor according to claim 2, wherein the stabilization poles (Ps) and elementary poles (Pc) each have a constant width from the first to the opposite edge of the magnetic ring.

4. The position sensor according to claim 3, wherein all the stabilization poles (Ps) are identical in width.

5. The position sensor according to claim 3, wherein all the stabilization poles (Ps) are different in width.

6. The position sensor according to claim 3, wherein all the stabilization poles (Ps) and elementary poles (Pe) are identical in width.

7. The position sensor according to claim 3, wherein all the stabilization poles (Ps) are identical in width, and different in width from all of the elementary poles (Pe).

8. The position sensor according to claim 2, wherein the total width of the stabilization poles (Ps) is less than the total width of the elementary poles (Pe).

9. The position sensor according to claim 1, wherein the alternating North poles (N) and South poles (S) are saturated magnetic poles.

10. The position sensor according to claim 1, wherein the at least one stabilization pole (Ps) is inserted into the irregular pole (Pi) to stabilize the magnetic signal delivered by the passage of the poles adjacent to the irregular pole, so that such a signal, considered between the passage of an adjacent pole and a middle portion of the irregular pole, changes monotonously.

11. The position sensor according to claim 1, wherein the at least one stabilization pole (Ps) is inserted into the irregular pole (Pi) to stabilize the magnetic signal delivered by the passage of the poles adjacent to the irregular pole, so that such a signal is symmetrical with respect to the zero value of the magnetic field.

12. The position sensor according to claim 1, wherein the at least one stabilization pole (Ps) is inserted in to the irregular pole (Pi) to stabilize the magnetic signal delivered by the passage of the poles adjacent to the irregular pole, so that such a signal has constant period as regards the poles adjacent to the irregular pole.

13. The position sensor according to claim 1, wherein the at least one stabilization pole (Ps) is inserted into the irregular pole (Pi) to stabilize the magnetic signal delivered by the passage of the poles adjacent to the irregular pole, so that such a signal has a symmetry with respect to the middle of the irregular pole.

14. The position sensor according to claim 1, wherein the measurement cell is a Hall effect cell, a differential Hall effect cell, a Hall effect cell with flux concentrator, a magnetoresistive cell, or a giant magnetoresistance cell.

15. The position sensor according to claim 1, wherein the encoder is blocked in rotation on a shaft of an engine of a motor vehicle.

* * * * *